US012619564B2

(12) United States Patent
Ma et al.

(10) Patent No.: US 12,619,564 B2
(45) Date of Patent: May 5, 2026

(54) PRIMARY INPUT-OUTPUT QUEUE SERVING HOST AND GUEST OPERATING SYSTEMS CONCURRENTLY

(71) Applicant: Advanced Micro Devices, Inc., Santa Clara, CA (US)

(72) Inventors: XiaoJing Ma, Shanghai (CN); Ling-Ling Wang, Santa Clara, CA (US); Jin Xu, Shanghai (CN); ZengRong Huang, Shanghai (CN); Lina Ma, Shanghai (CN); Wei Shao, Beijing (CN); LingFei Shi, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/389,925

(22) Filed: Jul. 30, 2021

(65) Prior Publication Data

US 2023/0033583 A1    Feb. 2, 2023

(51) Int. Cl.
*G06F 13/28* (2006.01)
*G06F 13/16* (2006.01)

(52) U.S. Cl.
CPC .......... *G06F 13/28* (2013.01); *G06F 13/1642* (2013.01); *G06F 2213/28* (2013.01)

(58) Field of Classification Search
CPC ...................................................... G06F 9/455
USPC .............................................................. 718/1
See application file for complete search history.

(56) References Cited

U.S. PATENT DOCUMENTS

| | | | |
|---|---|---|---|
| 4,718,008 A | 1/1988 | Chang et al. | |
| 5,303,378 A | 4/1994 | Cohen | |
| 6,785,886 B1 | 8/2004 | Lim et al. | |
| 7,209,994 B1 | 4/2007 | Klaiber et al. | |
| 7,409,487 B1* | 8/2008 | Chen ................... | G06F 12/1036 |
| | | | 711/6 |
| 8,032,897 B2 | 10/2011 | Serebrin | |
| 8,127,098 B1 | 2/2012 | Klaiber et al. | |
| 9,081,602 B1* | 7/2015 | Omelyanchuk ..... | G06F 9/45545 |
| 2003/0120856 A1* | 6/2003 | Neiger ................ | G06F 12/0284 |
| | | | 711/6 |
| 2003/0217250 A1 | 11/2003 | Bennett et al. | |
| 2004/0003324 A1 | 1/2004 | Uhlig et al. | |
| 2004/0117532 A1 | 6/2004 | Bennett et al. | |

(Continued)

OTHER PUBLICATIONS

"Intel® 64 and IA-32 Architectures, Software Developer's Manual", vol. 3B: System Programming Guide, Part 2, May 2007, 6 pages.

(Continued)

*Primary Examiner* — Titus Wong
(74) *Attorney, Agent, or Firm* — Kowert, Hood, Munyon, Rankin & Goetzel, P.C.; Rory D. Rankin

(57) ABSTRACT

Systems, apparatuses, and methods for implementing a primary input/output (PIO) queue for host and guest operating systems (OS's) are disclosed. A system includes a PIO queue, one or more compute units, and a control unit. The PIO queue is able to store work commands for multiple different types of OS's, including host and guest OS's. The control unit is able to dispatch multiple work commands from multiple OS's to execute concurrently on the compute unit(s). This allows for execution of work commands by different OS's without the processing device(s) having to incur the latency of a world switch.

20 Claims, 9 Drawing Sheets

(56) References Cited

U.S. PATENT DOCUMENTS

| | | | |
|---|---|---|---|
| 2007/0234358 A1 | 10/2007 | Hattori et al. | |
| 2008/0082722 A1 | 4/2008 | Savagaonkar et al. | |
| 2009/0006805 A1 | 1/2009 | Anderson et al. | |
| 2009/0106762 A1* | 4/2009 | Accapadi | G06F 9/5027 |
| | | | 718/103 |
| 2009/0119087 A1* | 5/2009 | Ang | G06F 9/45558 |
| | | | 703/23 |
| 2009/0187697 A1* | 7/2009 | Serebrin | G06F 9/455 |
| | | | 711/6 |
| 2009/0187698 A1* | 7/2009 | Serebrin | G06F 9/455 |
| | | | 718/1 |
| 2011/0161955 A1* | 6/2011 | Woller | G06F 9/45545 |
| | | | 718/1 |
| 2012/0117564 A1* | 5/2012 | Friebel | G06F 9/45541 |
| | | | 718/1 |
| 2013/0152099 A1* | 6/2013 | Bass | G06F 9/5038 |
| | | | 718/103 |
| 2013/0198743 A1* | 8/2013 | Kruglick | G06F 9/45533 |
| | | | 718/1 |
| 2013/0305246 A1* | 11/2013 | Goggin | H04L 47/783 |
| | | | 718/1 |
| 2014/0123145 A1* | 5/2014 | Barrow-Williams | |
| | | | G06F 12/109 |
| | | | 718/102 |
| 2015/0143373 A1* | 5/2015 | Nelson | G06F 9/45504 |
| | | | 718/1 |
| 2015/0160964 A1* | 6/2015 | Nelson | G06F 3/0647 |
| | | | 718/1 |
| 2015/0370590 A1* | 12/2015 | Tuch | G06F 9/4843 |
| | | | 718/1 |
| 2016/0019079 A1* | 1/2016 | Chawla | G06F 9/45558 |
| | | | 710/308 |
| 2017/0033991 A1* | 2/2017 | Stefansson | H04L 67/10 |
| 2017/0147369 A1* | 5/2017 | Spracklen | G06F 9/45533 |
| 2018/0045431 A1* | 2/2018 | Waldspurger | G06F 11/1407 |
| 2019/0132381 A1* | 5/2019 | Momchilov | G06F 3/01 |
| 2020/0174819 A1* | 6/2020 | Dong | G06F 13/1668 |
| 2020/0278938 A1* | 9/2020 | Vembu | G06F 13/1642 |
| 2020/0356410 A1* | 11/2020 | Gull | G06F 17/11 |
| 2021/0049728 A1* | 2/2021 | Ray | G06F 12/0888 |
| 2021/0279090 A1* | 9/2021 | Hu | G06F 9/45558 |

OTHER PUBLICATIONS

Waldspurger, Carl A., "Memory Resource Management in VMware ESX Server", Proceedings of the 5th Symposium on Operating Systems Design and Implementation, Dec. 9-11, 2002, 15 pages.
Waldspurger, Carl, vmware, "Memory Resource Management in VMware ESX Server," OSDI '02 Presentation, Dec. 10, 2002, 24 pages.
"XenFaq—Xen Wiki", http://wiki.xensource.com/xenwiki/XenFaq?action=print, 15 pages, 2007. [Retrieved Jul. 13, 2007].
Barham et al., "Xen and the Art of Virtualization," SOSP '03: Proceedings of the Nineteenth ACM Symposium on Operating Systems Principles, Oct. 19-22, 2003, ACM, 14 pages.

* cited by examiner

200

VM
210N

Applications
220N

Guest Operating
System
225N

VM
210B

Applications
220B

Guest Operating
System
225B

VM
210A

Applications
220A

Guest Operating
System
225A

Hypervisor
230

Host Operating System
240

Computing Resources
250

600

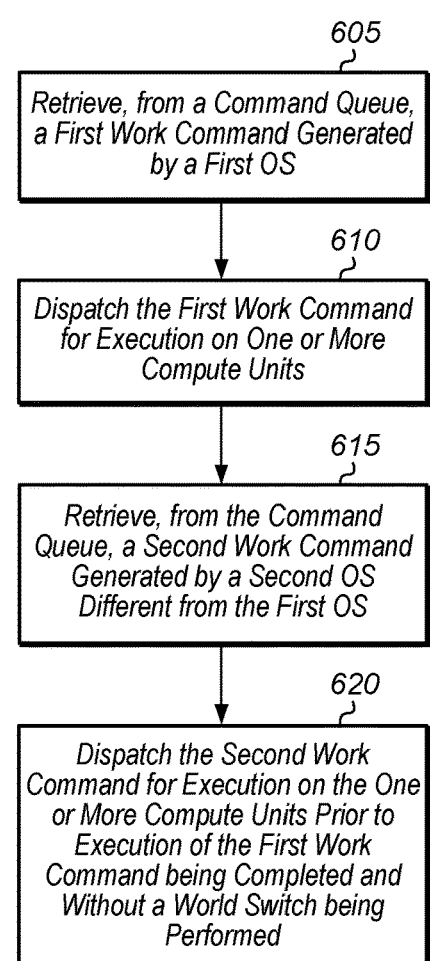

605

Retrieve, from a Command Queue,
a First Work Command Generated
by a First OS

610

Dispatch the First Work Command
for Execution on One or More
Compute Units

615

Retrieve, from the Command
Queue, a Second Work Command
Generated by a Second OS
Different from the First OS

620

Dispatch the Second Work
Command for Execution on the One
or More Compute Units Prior to
Execution of the First Work
Command being Completed and
Without a World Switch being
Performed

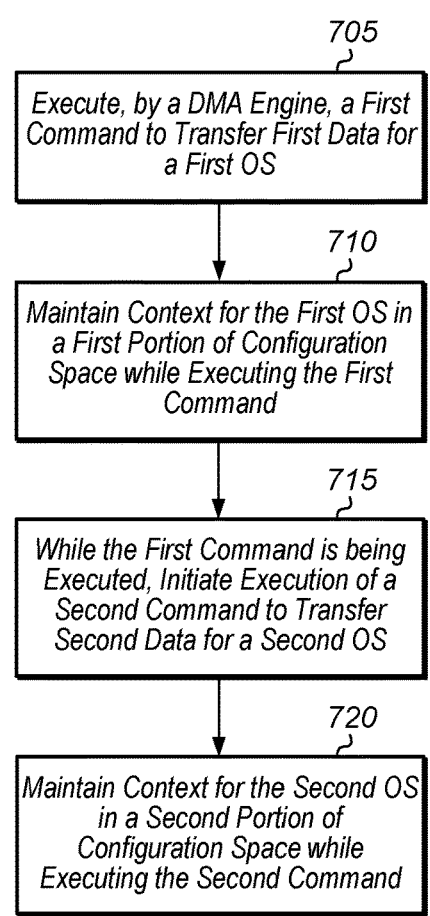

705

Execute, by a DMA Engine, a First Command to Transfer First Data for a First OS

710

Maintain Context for the First OS in a First Portion of Configuration Space while Executing the First Command

715

While the First Command is being Executed, Initiate Execution of a Second Command to Transfer Second Data for a Second OS

720

Maintain Context for the Second OS in a Second Portion of Configuration Space while Executing the Second Command

*FIG. 7*

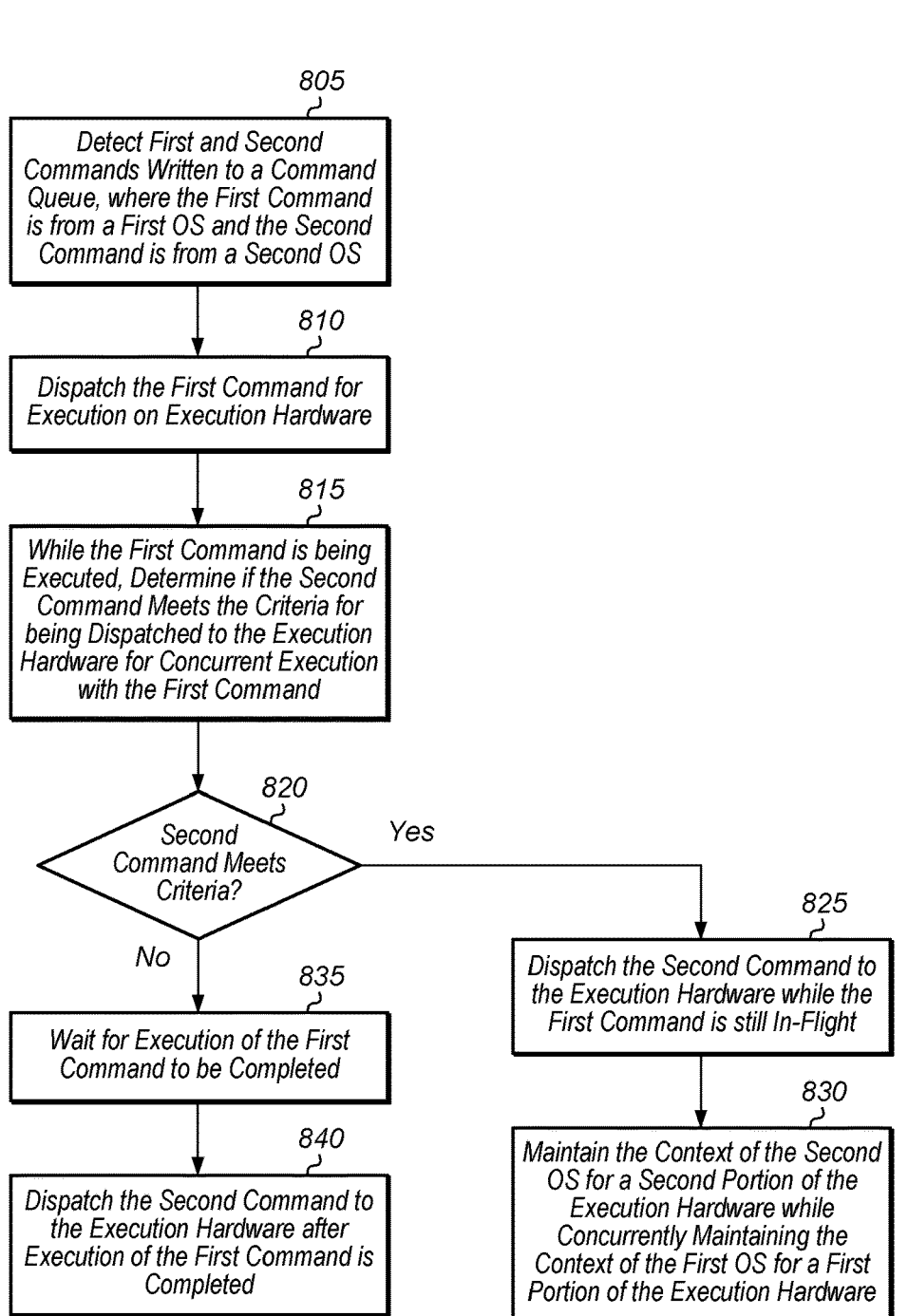

*800*

805

Detect First and Second Commands Written to a Command Queue, where the First Command is from a First OS and the Second Command is from a Second OS

810

Dispatch the First Command for Execution on Execution Hardware

815

While the First Command is being Executed, Determine if the Second Command Meets the Criteria for being Dispatched to the Execution Hardware for Concurrent Execution with the First Command

820

Second Command Meets Criteria?

Yes

No

825

Dispatch the Second Command to the Execution Hardware while the First Command is still In-Flight

835

Wait for Execution of the First Command to be Completed

830

Maintain the Context of the Second OS for a Second Portion of the Execution Hardware while Concurrently Maintaining the Context of the First OS for a First Portion of the Execution Hardware

840

Dispatch the Second Command to the Execution Hardware after Execution of the First Command is Completed

*FIG. 8*

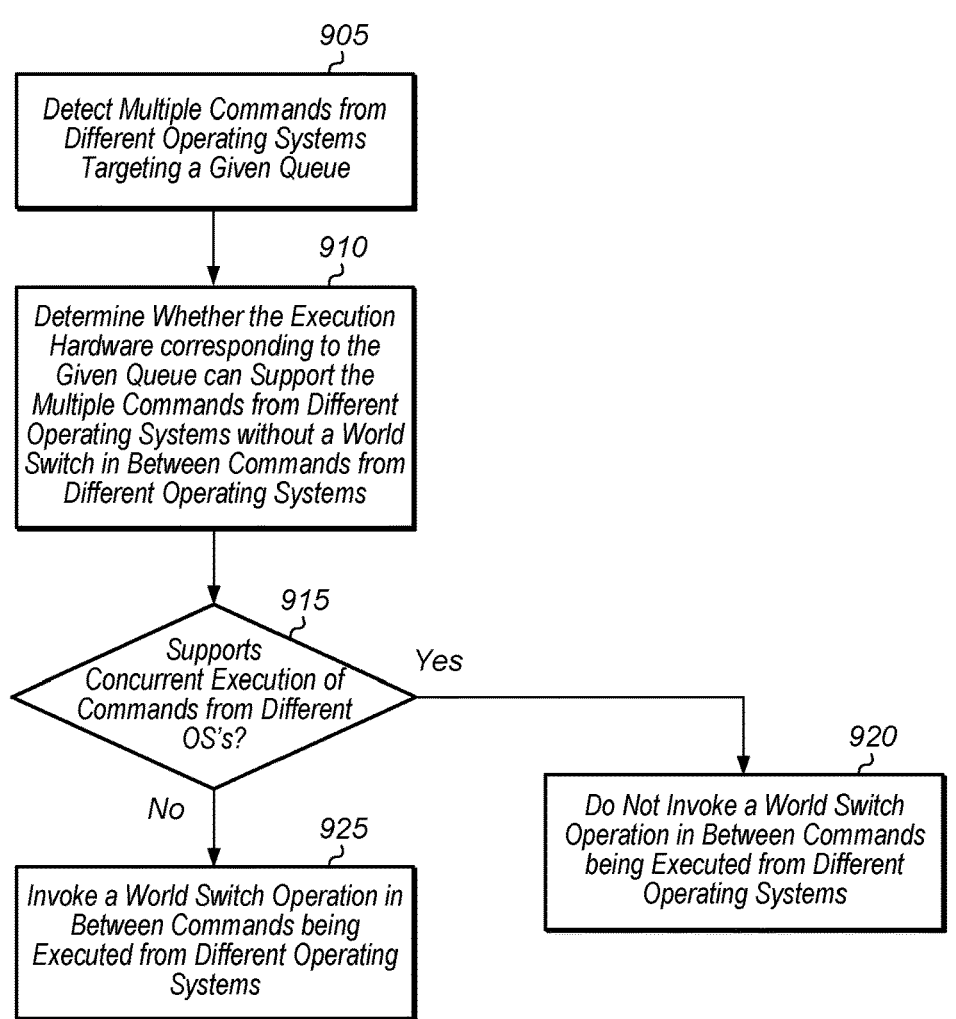

_900_

_905_

Detect Multiple Commands from Different Operating Systems Targeting a Given Queue

_910_

Determine Whether the Execution Hardware corresponding to the Given Queue can Support the Multiple Commands from Different Operating Systems without a World Switch in Between Commands from Different Operating Systems

_915_

Supports Concurrent Execution of Commands from Different OS's?

Yes

_920_

Do Not Invoke a World Switch Operation in Between Commands being Executed from Different Operating Systems No

_925_

Invoke a World Switch Operation in Between Commands being Executed from Different Operating Systems

_FIG. 9_

PRIMARY INPUT-OUTPUT QUEUE SERVING HOST AND GUEST OPERATING SYSTEMS CONCURRENTLY

BACKGROUND

Description of the Related Art

Virtualization has been used in data processing devices for a variety of different purposes. Generally, virtualization of a data processing device may include providing one or more privileged programs with access to a virtual machine over which the privileged program has full control, but the control of the physical device is retained by a virtual machine manager (VMM). The privileged program, referred to herein as a guest, provides commands and other information targeted to hardware expected by the guest. The VMM intercepts the commands, and assigns hardware of the data processing device to execute each intercepted command. Virtualization may be implemented in software (e.g., the VMM mentioned above) without any specific hardware virtualization support in the physical machine on which the VMM and its virtual machines execute. In other implementations, the hardware of the data processing device can provide support for virtualization.

Both the VMM and the guests are executed by one or more processors included in the physical data processing device. Accordingly, switching between execution of the VMM and the execution of guests occurs in the processors over time. For example, the VMM can schedule a guest for execution, and in response the hardware executes the guest VM. At various points in time, a switch from executing a guest to executing the VMM also occurs so that the VMM can retain control over the physical machine (e.g., when the guest attempts to access a peripheral device, when a new page of memory is to be allocated to the guest, when it is time for the VMM to schedule another guest, etc.). A switch between a guest and the VMM (in either direction) is referred to for purposes of discussion as a "world switch." Generally, the world switch involves saving processor state for the guest/VMM being switched away from, and restoring processor state for the guest/VMM being switched to.

BRIEF DESCRIPTION OF THE DRAWINGS

The advantages of the methods and mechanisms described herein may be better understood by referring to the following description in conjunction with the accompanying drawings, in which:

FIG. 6 is a generalized flow diagram illustrating one implementation of a method for command queue serving multiple operating systems concurrently.

FIG. 7 is a generalized flow diagram illustrating one implementation of a method for performing data transfers for multiple operating systems concurrently.

FIG. 8 is a generalized flow diagram illustrating one implementation of a method for determining whether to execute commands concurrently.

FIG. 9 is a generalized flow diagram illustrating one implementation of a method for determining whether to invoke a world switch operation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a primary input/output (PIO) queue for host and guest operating systems (OS's) are disclosed herein. In one implementation, a system includes a PIO queue, one or more compute units, and a control unit. The PIO queue is able to store work commands for multiple different types of OS's, including host and guest OS's. The control unit is able to dispatch multiple work commands from multiple OS's to execute concurrently on the compute unit(s). This allows for execution of work commands by different OS's without the processing device(s) having to incur the latency of a world switch.

Figure 1:
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a graphics processing unit (GPU) which processes data, executes parallel processing workloads, renders pixels for display controller 150 to drive to display 155, and/or executes other workloads.

A GPU is a complex integrated circuit that performs graphics-processing tasks. For example, a GPU executes graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for a meta-app, a second set of program instructions for a driver component, and so on. Alternatively, program instructions 145 can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 supports a virtualization environment. In a virtualization environment, a computing device executes virtual machines, which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems, called "guest" operating systems. The guest operating systems in turn provide support for executing other software programs such as applications, databases, etc.

In the described implementations, the computing device may execute two or more virtual machines concurrently (e.g., in corresponding time slices, in parallel on one or more processor cores, etc.). In these implementations, each virtual machine may be associated with various hardware resources that are allocated for the virtual machine's use. For example, each virtual machine may be provided with exclusive access to allocated region(s) of memory (e.g., contiguous or non-contiguous blocks of memory). In one implementation, a hypervisor enforces access controls for each virtual machine. A hypervisor is a software entity that operates or executes on the computing device and functions as a manager or controller for the virtual machines executing on the computing device. For example, the hypervisor may start or initialize virtual machines, control accesses of computing device hardware by virtual machines, terminate or close virtual machines, etc.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
FIG. 2 is a block diagram of virtual machines and a hypervisor in accordance with some implementations.

Turning now to FIG. 2, a block diagram illustrating virtual machines and a hypervisor in accordance with some implementations is shown. As can be seen in FIG. 2, there are multiple virtual machines ("VMs") 210A-N, each of which executes a guest operating system 225A-N, respectively, and one or more applications 220A-N, respectively, such as databases, software programs, etc. The virtual machines 210A-N communicate with a hypervisor 230, which interfaces between a host operating system 240 and the virtual machines 210A-N. Host operating system 240 provides an interface between computing resources 250 and hypervisor 230. Computing resources 250 can include, but are not limited to, any of the physical hardware components/devices shown in system 100 of FIG. 1. Although various elements are presented in FIG. 2, in some implementations, different arrangements of elements can be employed. For example, in some implementations, host operating system 240 is not present and hypervisor 230 communicates more directly with computing resources 250.

Figure 3:
FIG. 3 is a block diagram of one implementation of a computing system.
Figure 3:
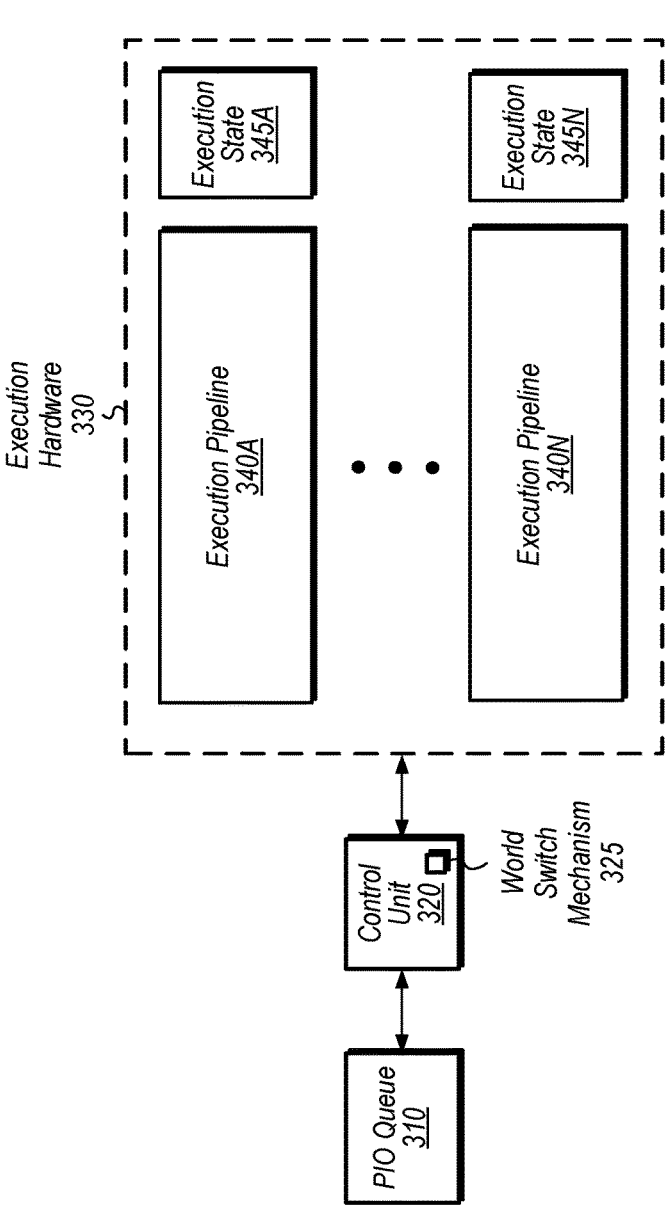

Referring now to FIG. 3, a block diagram of one implementation of a computing system 300 is shown. As shown in FIG. 3, computing system 300 includes primary input/output (PIO) queue 310, control unit 320, and execution hardware 330. Execution hardware 300 includes any number and type of execution pipelines 340A-N and corresponding execution states 345A-N. Depending on the implementation, execution pipelines 340A-N can include direct memory access (DMA) engines, compute units, load/store units, integer units, floating point units, graphics engines, compute engines, and so on. It is noted that the control unit 320 can also be referred to herein as a dispatch unit 320 or as DMA engine 320.

When control unit 320 detects that software has written a command to PIO queue 310, control unit 320 determines if the resources are available for dispatching the command to execution hardware 330. For example, in one implementation, there is a first execution pipeline 340 for a host OS and a second execution pipeline 340 for a guest OS. In this implementation, if the host OS places a first command in PIO queue 310, then if the first execution pipeline 340 is not occupied, then control unit 320 dispatches the first command for execution on the first execution pipeline 340. While the first command (for the host OS) is being executed on the first execution pipeline 340, if a guest OS places a command on PIO queue 310, then if the second execution pipeline 340 is available, then control unit 320 dispatches the second command for execution on the second execution pipeline 340. The control unit 320 is able to dispatch the second command without the hypervisor having to first perform a world switch. This helps system 300 avoid incurring the world switch latency when alternating between executing host OS and guest OS commands.

It is noted that world switch mechanism 325 can include any combination of control circuitry and/or program instructions. For example, in one implementation, world switch mechanism 325 is a software routine for swapping out the context of a first OS for a second OS, where the software routine includes program instructions executable by a processor, control unit, or other device. In another implementation, world switch mechanism 325 is a combination of hardware circuitry and program instructions. In other implementations, world switch mechanism 325 includes other combinations of circuitry, firmware, software, and/or other resources.

Figure 4:
FIG. 4 is a block diagram of one implementation of resources allocated for virtual machines.
Figure 4:
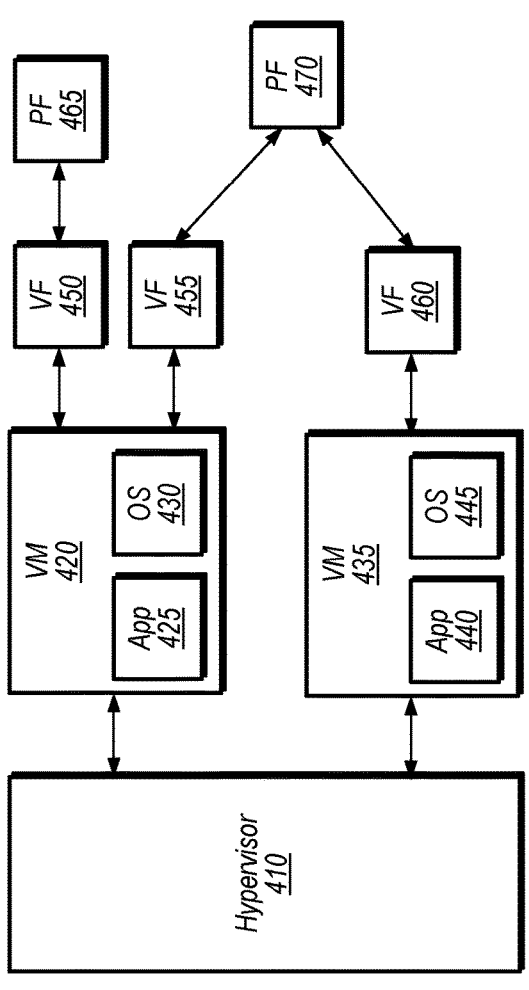

Turning now to FIG. 4, a block diagram of one implementation of resources allocated for virtual machines is shown. Virtual machines (VMs) can be employed in a variety of different computing system with different types of resources available for use by the VMs. Various standards and protocols (e.g., Peripheral Component Interconnect (PCI), PCI Express (PCIe)) exist for connecting peripheral devices to the computing system and communicating with the VMs and other software resources. PCI, PCIe, and similar peripheral connection protocols utilize memory mapped input/output (MMIO) in which data and commands are exchanged between one or more processors and one or more input/output (I/O) devices (also referred to as peripheral devices) via addressing that is mapped to a memory address space, such as the same memory address space representing a system memory. Input/output virtualization (IOV) techniques allow a single physical I/O resource to be shared among multiple VMs in a virtualized environment by presenting the physical I/O resource as multiple virtual I/O resources. For example, for single-root IOV (SR-IOV) for PCIe and similar I/O virtualization specifications, each physical function of an I/O device may be duplicated, in whole or in part, as one or more virtual functions, with each virtual function having its own configuration space and MMIO address space(s) and being assignable to a corresponding VM.

To facilitate efficient virtualization and to secure access to the allocated resources of VMs 420 and 435, system 400 employs SR-IOV or another I/O virtualization technique. In PCIe, each I/O device presents itself to the system 400 as one or more physical functions, where each physical function represents an independent functionality of the I/O device in that each physical function is capable of operating as a target for a bus transaction, as well as capable of operating as an initiator of a bus transaction. An I/O device may include multiple physical functions as a reflection of a number of separate or disparate functionality provided by the I/O device. In the SR-IOV protocol (and other IOV protocols), an SR-IOV enabled I/O device may present a physical function (PF) as one or more virtual functions (VF), where each VF may be separately assigned to corresponding VMs 420 and 435 and behave in the same manner as the PF from the perspective of the VM. That is, a VF is assigned to a particular VM and operates from the perspective of the VM as though it were the PF. In this manner, a single PF of an I/O resource can be shared among multiple VMs in a manner that reduces or eliminates interference or conflict amongst the VMs. To illustrate, it is assumed that the functionality of a first peripheral device is made available as a PF 465, which is virtualized as a VF 450, which is assigned to the VM 420. The functionality of a second peripheral device is made available as a PF 470, which is virtualized as two VFs 455 and 460, with VF 455 being assigned to VM 420 and VF 460 being assigned to VM 435. Each presented function of an I/O device, whether a PF or a VF, acts as an I/O resource of system 400.

In PCI, PCIe, and similar protocols, each PF or VF is represented to the software of the processing system 400 by a set of registers that are mapped to a configuration address space in the system address map, these set of registers to store information uniquely identifying the resource, information representing the capabilities of the corresponding function, and information representing the resource needs of the function, as well as the MMIO address space(s) and other system resources allocated to the function. In PCI, this set of MMIO-addressed registers generally is referred to as a "configuration space" of the corresponding function or device. PCIe has a larger and more detailed configuration space, referred to as an "extended configuration space." Further, PFs and VFs each have their own configuration spaces, such as a first configuration space for PF 465 and a second configuration space for VF 450.

For PCI and PCIe, the basic format of a configuration space of an I/O resource typically includes a configuration header, one or more base address registers (BARs), and some additional control fields. The format and fields of the configuration header typically depends on the type (device or bridge) of the corresponding I/O resource, but generally include fields for storing a device identifier (e.g., a bus-device-function (BDF) identifier), a vendor identifier, a header type, and the like. Each BAR, after enumeration, identifies the base address of a corresponding MMIO address range assigned to the I/O resource. For PCIe, the configuration space further may include one or more extended capability structures, such as a resizable BAR extended capability structure that allows the I/O resource to present multiple size options, an SR-IOV extended capability structure that facilitates management of the VFs associate with a PF, and the like.

In one implementation, hypervisor 410 has control of the configuration spaces of the I/O resources of an I/O subsystem in order to facilitate resource allocation, such as MMIO address allocation at initial configuration, programming the bus-device-functions of the various PFs and VFs, assigning or removing a device to or from a VM, and the like. In the prior art, hypervisor 410 would switch between PF and VF to serve different OS's. However, in the implementations described throughout this disclosure, a PIO queue (e.g., PIO queue 310 of FIG. 3) can serve multiple different OS's concurrently, whether in PF or VF. In other words, the PIO queue can accept work requests from different OS's, including from a host OS and one or more guest OS's.

Figure 5:
FIG. 5 is a block diagram of one implementation of a computing system capable of concurrently executing multiple commands from multiple operating systems (OS's).
Figure 5:
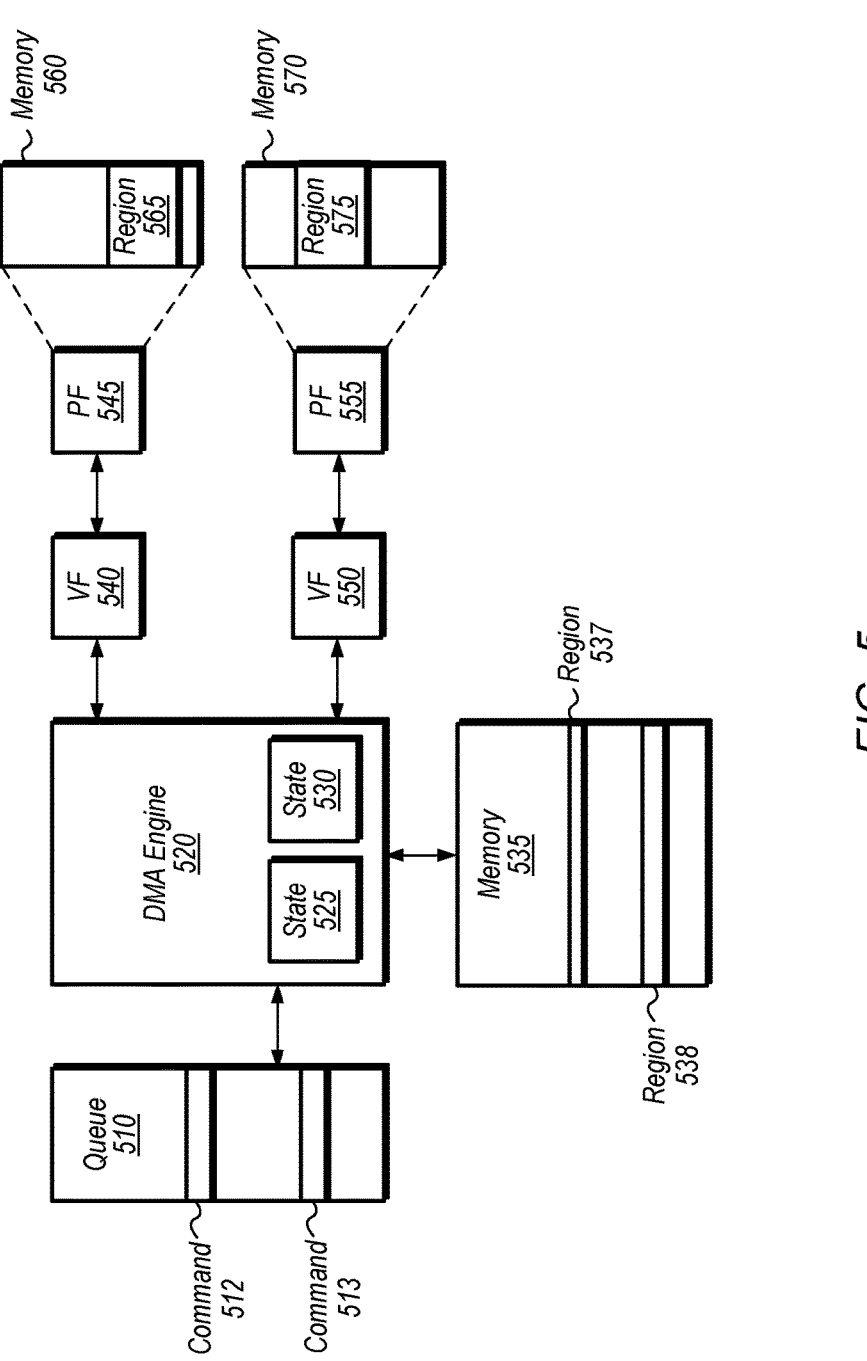

Referring now to FIG. 5, a block diagram of one implementation of a computing system 500 capable of concurrently executing multiple commands from multiple operating systems (OS's) is shown. As shown in FIG. 5, DMA engine 520 is coupled to queue 510, with DMA engine 520 monitoring the work commands that are written to queue 510. In one implementation, queue 510 accepts work commands from multiple different OS's. As shown, queue 510 includes commands 512 and 513. It is assumed for the purposes of this discussion that command 512 is generated by a first OS and command 513 is generated by a second OS different from the first OS. It is noted that commands 512 and 513 can also be referred to as work requests 512 and 513.

DMA engine 520 monitors queue 510 and detects commands 512 and 513 being written to queue 510. It is assumed for the purpose of this discussion that commands 512 and 513 are DMA commands. DMA engine 520 can include any suitable combination of circuitry, processing elements, and program instructions. It should be understood that DMA engine 520 is merely one type of processing engine or control unit that can be coupled to and monitoring queue 510. In other implementations, other types of processing units and/or control units can perform similar functions as are described for DMA engine 520 for other types of work commands besides data movement jobs.

Physical function (PF) 545 and virtual function (VF) 540 are shown coupled to DMA engine 520, with PF 545 representing memory 560 and with VF 540 representing PF 545 to the first OS. It is assumed for the purposes of this discussion that command 512 involves the transfer of data from region 565 of memory 560 to region 537 of memory 535. It is noted that in one implementation, memory 560 corresponds to a memory space of a peripheral device while memory 535 corresponds to system memory of computing system 500. Additionally, PF 555 and VF 550 are shown coupled to DMA engine 520, with PF 555 representing memory 570 and with VF 550 representing PF 555 to the second OS. It is assumed for the purposes of this discussion that command 513 involves the transfer of data from region 575 of memory 570 to region 538 of memory 535. It is noted that in one implementation, memory 570 corresponds to a memory space of a peripheral device.

It a typical system, since commands 512 and 513 are from different OS's, a world switch would be performed in between the execution of commands 512 and 513. However, DMA engine 520 includes the circuitry and capability to execute commands 512 and 513 concurrently. DMA engine 520 stores the execution context (i.e., execution state) of the first OS in state 525 for execution of command 512. Additionally, DMA engine 520 stores the execution context of the second OS in state 530 for execution of command 513. States 525 and 530 include any number and combination of registers, memory elements, cache units, storage locations, and the like for storing execution contexts. States 525 and 530 can also be referred to herein as portions of a configuration space. This allows DMA engine 520 to simultaneously execute commands 512 and 513 to transfer data between region 537 and region 565 while concurrently transferring data between region 538 and region 575. Also, commands 512 and 513 are executed without a world switch being performed between the first and second OS's. This results in commands 512 and 513 being executed more efficiently (i.e., with lower latency) than is possible in the prior art.

Turning now to FIG. 6, one implementation of a method 600 for a command queue serving multiple operating systems concurrently is shown. For purposes of discussion, the steps in this implementation and those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600 (and methods 700-800).

A control unit retrieves, from a command queue (e.g., PIO queue 310 of FIG. 3) a first work command generated by a first OS (block 605). The control unit dispatches the first work command for execution on one or more compute units (block 610). The compute units are representative of any type of processor, control unit, DMA engine, or other circuitry/devices. Next, the control unit retrieves, from the command queue, a second work command generated by a second OS different from the first OS (block 615). The control unit dispatches the second work command for execution on the one or more compute units prior to execution of the first work command being completed and without a world switch being performed (block 620). After block 620, method 600 ends.

Referring now to FIG. 7, one implementation of a method 700 for performing data transfers for multiple operating systems concurrently is shown. A DMA engine (e.g., DMA engine 520 of FIG. 5) executes a first command to transfer first data for a first OS (block 705). In one implementation, the first OS is a host OS. The DMA engine maintains context for the first OS in a first portion of configuration space while executing the first command (block 710). While the first command is being executed, the DMA engine initiates execution of a second command to transfer second data for a second OS (block 715). In one implementation, the second OS is a guest OS. The DMA engine maintains context for the second OS in a second portion of configuration space while executing the second command (block 720). After block 720, method 700 ends. It is noted that in other implementations, the DMA engine can concurrently execute more than two commands to transfer data simultaneously for more than two different OS's.

Turning now to FIG. 8, one implementation of a method 800 for determining whether to execute commands concurrently is shown. A control unit (e.g., control unit 320 of FIG. 3) detects first and second commands written to a command queue (e.g., PIO queue 310), where the first command is from a first OS and the second command is from a second OS (block 805). It is assumed for the purposes of this discussion that the second OS is different from the first OS. In some cases, the second OS is a different type of OS from the first OS. For example, the second OS is a host OS and the first OS is a guest OS in one implementation. The control unit dispatches the first command for execution on execution hardware (e.g., execution hardware 330) (block 810). It is noted that while the second command is described as having been written to the command queue before the first command is dispatched for execution, it should be understood that this represents one possibility. It is also possible that the second command is written to the command queue after the first command is dispatched for execution.

While the first command is being executed (i.e., before execution of the first command is complete), the control unit determines if the second command meets the criteria for being dispatched to the execution hardware concurrently while the first command is being executed (block 815). In one implementation, the criteria includes execution resources for the second command and configuration space for storing the context of the second OS currently being available. In other implementations, other criteria can be used for determining whether the second command can be dispatched to the execution hardware for concurrent execution with the first command.

If the second command meets the criteria for being dispatched to the execution hardware concurrently while the first command is being executed (conditional block 820, "yes" leg), then the control unit dispatches the second command to the execution hardware while the first command is still in-flight (block 825). During simultaneous execution of the second and first commands, the control unit maintains the context of the second OS for a second portion of the execution hardware while concurrently maintaining the context of the first OS for a first portion of the execution hardware (block 830).

Otherwise, if the second command does not meet the criteria for being dispatched to the execution hardware concurrently while the first command is being executed (conditional block 820, "no" leg), then the control unit waits for execution of the first command to be completed (block 835). Then, the control unit dispatches the second command to the execution hardware after execution of the first command is completed (block 840). After block 840, method 800 ends.

Referring now to FIG. 9, one implementation of a method 900 for determining whether to invoke a world switch operation is shown. A hypervisor detects multiple commands from different operating systems targeting a given queue (block 905). The hypervisor determines whether the execution hardware corresponding to the given queue can support the multiple commands from different operating systems without a world switch in between commands from different operating systems (block 910). In one implementation, the hypervisor maintains a table with data on the different execution hardware corresponding to the command queues in the system, with the table indicating if each execution hardware unit supports concurrent execution of commands from different operating systems. In some cases, the hypervisor queries execution hardware to determine if the execution hardware supports concurrent execution of commands from different operating systems. In other cases, the execution hardware sends an indication to the hypervisor to indicate whether the execution hardware supports concurrent execution of commands from different operating systems.

If the execution hardware corresponding to the given queue queue can execute commands from different operating systems concurrently without a world switch in between commands from different operating systems (conditional block 915, "yes" leg), then the hypervisor does not invoke a world switch operation in between commands from different operating systems being executed (block 920). Otherwise, if the execution hardware corresponding to the given queue queue cannot execute commands from different operating systems concurrently (conditional block 915, "no" leg), then the hypervisor invokes a world switch operation in between commands from different operating systems being executed (block 925). After blocks 920 and 925, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   control circuitry configured to dispatch for execution on a plurality of compute circuits in a given processor of one or more processors:
   a first work command retrieved from a queue, wherein the first work command is generated by a first operating system (OS); and
   a second work command retrieved from the queue, responsive to the second work command meeting criteria to be dispatched for execution, wherein the second work command is generated by a second OS different from the first OS; and
   wherein at least a portion of execution of the second command occurs concurrently with execution of the first work command in the given processor.

2. The apparatus as recited in claim 1, wherein the first OS is a host OS, and wherein the second OS is a guest OS.

3. The apparatus as recited in claim 1, wherein the criteria include the plurality of compute circuits comprising available resources to perform concurrent execution of commands from a plurality of operating systems.

4. The apparatus as recited in claim 3, wherein the control circuitry is further configured to dispatch the second work command subsequent to dispatching the first work command within a first latency that is less than a second latency associated with a world switch operation.

5. The apparatus as recited in claim 1, wherein the first work command and the second work command are direct memory access (DMA) work commands.

6. The apparatus as recited in claim 1, further comprising a hypervisor configured to:
   determine whether the second work command meets the criteria to be dispatched to the one or more compute circuits without invoking a world switch operation;
   and wait for completion of the first work command prior to the second work command being dispatched to the one or more compute circuits, responsive to determining that the second work command does not meet the criteria.

7. The apparatus as recited in claim 1, wherein the control circuitry is further configured to concurrently store contexts for the first OS and the second OS during concurrent execution of the first work command and the second work command.

8. A method comprising:
   dispatching, by control circuitry, for execution on a plurality of compute circuits in a given processor of one or more processors:
   a first work command retrieved from a queue, wherein the first work command is generated by a first operating system (OS); and
   a second work command retrieved from the queue, responsive to the second work command meeting criteria to be dispatched for execution, wherein the second work command is generated by a second OS different from the first OS; and
   wherein at least a portion of execution of the second command occurs concurrently with execution of the first work command in the given processor.

9. The method as recited in claim 8, wherein the first OS is a host OS, and wherein the second OS is a guest OS.

10. The method as recited in claim 8, wherein the criteria include the one or more compute circuits comprising available resources to perform concurrent execution of commands from the plurality of operating systems.

11. The method as recited in claim 10, further comprising dispatching the second work command subsequent to dispatching the first work command within a first latency that is less than a second latency associated with a world switch operation.

12. The method as recited in claim 8, wherein the first work command and the second work command are direct memory access (DMA) work commands.

13. The method as recited in claim 8, further comprising:
   determining whether the second work command meets the criteria to be dispatched to the one or more compute circuits without invoking a world switch operation;
   and waiting for completion of the first work command prior to dispatching the second work command to the one or more compute circuits responsive to determining that the second work command does not meet the criteria.

14. The method as recited in claim 8, further comprising concurrently storing contexts for the first OS and the second OS during concurrent execution of the first work command and the second work command.

15. A system comprising:
   one or more processors comprising a plurality of compute circuits configured to execute a plurality of operating systems;
   a queue for storing work commands generated by the plurality of operating systems running on the one or more processors; and
   control circuitry in a given processor of the one or more processors configured to dispatch for execution on the plurality of compute circuits in the given processor:
      a first work command retrieved from a queue, wherein the first work command is generated by a first operating system (OS); and
      a second work command retrieved from the queue, responsive to the second work command meeting criteria to be dispatched for execution, wherein the second work command is generated by a second OS different from the first OS; and
      wherein at least a portion of execution of the second command occurs concurrently with execution of the first work command in the given processor.

16. The system as recited in claim 15, wherein the first OS is a host OS, and wherein the second OS is a guest OS.

17. The system as recited in claim 15, wherein the criteria include the one or more compute circuits comprising available resources to perform concurrent execution of commands from the plurality of operating systems.

18. The system as recited in claim 17, wherein the control circuitry is further configured to dispatch the second work command subsequent to dispatching the first work command within a first latency that is less than a second latency associated with a world switch operation.

19. The system as recited in claim 15, further comprising a hypervisor configured to:
   determine whether the second work command meets the criteria to be dispatched to the one or more compute circuits without invoking a world switch operation;
   and wait for completion of the first work command prior to dispatching the second work command to the one or more compute circuits responsive to determining that the second work command does not meet the criteria.

20. The system as recited in claim 15, wherein the control circuitry is further configured to concurrently store contexts for the first OS and the second OS during concurrent execution of the first work command and the second work command.

* * * * *